United States Patent
Bonenfant

(10) Patent No.: US 11,192,321 B2
(45) Date of Patent: Dec. 7, 2021

(54) RIGID SHEET BLANK AND METHOD FOR PRODUCING SAME

(71) Applicant: OVH, Roubaix (FR)

(72) Inventor: Jules Hermann Bonenfant, Lys lez Lannoy (FR)

(73) Assignee: OVH, Roubaix (FR)

( * ) Notice: Subject to any disclaimer, the term of this patent is extended or adjusted under 35 U.S.C. 154(b) by 528 days.

(21) Appl. No.: 16/118,997

(22) Filed: Aug. 31, 2018

(65) Prior Publication Data

US 2019/0176429 A1 Jun. 13, 2019

(30) Foreign Application Priority Data

Dec. 13, 2017 (EP) ..................................... 17315011

(51) Int. Cl.
| | |
|---|---|
| *B31B 50/73* | (2017.01) |
| *B31B 50/20* | (2017.01) |
| *B23K 26/38* | (2014.01) |
| *B31B 50/25* | (2017.01) |
| *B31B 50/99* | (2017.01) |
| *B23K 26/364* | (2014.01) |
| *B21D 39/03* | (2006.01) |
| *B21D 51/52* | (2006.01) |
| *B21D 51/06* | (2006.01) |

(52) U.S. Cl.
CPC ............ *B31B 50/20* (2017.08); *B21D 39/032* (2013.01); *B21D 51/06* (2013.01); *B21D 51/52* (2013.01); *B23K 26/364* (2015.10); *B23K 26/38* (2013.01); *B31B 50/25* (2017.08); *B31B 50/73* (2017.08); *B31B 50/99* (2017.08); *Y10T 428/12236* (2015.01)

(58) Field of Classification Search
None
See application file for complete search history.

(56) References Cited

U.S. PATENT DOCUMENTS

| | | | |
|---|---|---|---|
| 2,919,633 A * | 1/1960 | Pierce, Jr. ............. | B65D 5/302 493/137 |
| 2003/0037586 A1 | 2/2003 | Durney et al. | |
| 2006/0207212 A1 | 9/2006 | Durney | |

(Continued)

FOREIGN PATENT DOCUMENTS

| | | |
|---|---|---|
| AU | 1095183 A | 8/1983 |
| CN | 101233286 A | 7/2008 |
| DE | 20202100 U1 | 6/2002 |

(Continued)

OTHER PUBLICATIONS

English machine translation of DE20202100U, EPO, accessed Dec. 1, 2020.*

(Continued)

*Primary Examiner* — Xiaobei Wang
(74) *Attorney, Agent, or Firm* — BCF LLP

(57) ABSTRACT

A rigid sheet blank includes a first section configured to be bent about a first axis and a second section configured to be bent about a second axis. The first section has a peripheral edge and at least one tab extending from the peripheral edge. The at least one tab is bendable by hand. The second section defines at least one opening configured for receiving a respective one of the at least one tab during bending of the rigid sheet blank.

14 Claims, 5 Drawing Sheets

(56) References Cited

U.S. PATENT DOCUMENTS

2011/0059330 A1   3/2011   Durney et al.

FOREIGN PATENT DOCUMENTS

| | | |
|---|---:|---|
| EP | 2395174 A1 | 12/2011 |
| JP | S5370069 A | 6/1978 |
| WO | 0213991 A1 | 2/2002 |
| WO | 2010099848 A1 | 9/2010 |

OTHER PUBLICATIONS

Shi et al., "Folded assembly methods for thin-walled steel structures", Jul. 30, 2017, J. of Constructional Steel Research, vol. 138, pp. 235-245. (Year: 2017).*
European Search Report with regard to the counterpart application EP17315011.1 completed Jun. 12, 2018.
English Abstract for EP2395174 retrieved on Espacenet on Aug. 2, 2018.
English Description and Claims for DE20202100 retrieved on Espacenet on Aug. 2, 2018.
European Search Report with regard to the counterpart application EP17315012.9 completed Jun. 15, 2018.
English Description and Claims for JPS5370069 retrieved on Espacenet on Aug. 31, 2018.
Office Action with regard to the CN Patent Application No. 201810996113.X dated Mar. 12, 2021.
English Abstract for CN101233286 retrieved on Espacenet on Apr. 8, 2021.

* cited by examiner

RIGID SHEET BLANK AND METHOD FOR PRODUCING SAME

CROSS-REFERENCE TO RELATED APPLICATION(S)

This United States Non-Provisional Patent Application relies for priority on European Patent Application Serial No. EP 17315011.1, filed on Dec. 13, 2017, the entire content of which is incorporated herein by reference.

FIELD OF TECHNOLOGY

The present technology relates to rigid sheet blanks for bending into a bent sheet component.

BACKGROUND

Sheet metal components are generally formed by cutting a metal sheet into a blank and bending the blank as required to form the desired sheet metal component. The bending process can be costly as it typically involves a qualified operator that is able to use machinery and/or tools such as presses and other specialized tooling. In order to avoid using tooling during bending, metal sheet blanks are sometimes provided with cuts at intended bend sites which act to locally weaken the metal sheet blank such as to facilitate bending thereof. In this manner, the metal sheet blank can be made bendable by hand which eliminates the need of a qualified operator and the associated machinery and/or tooling.

However, producing such weakening cuts in the metal sheet blank can be time-consuming. Notably, when a laser cutting machine is used to produce the metal sheet blank, the material being cut out from the metal sheet sometimes remains stuck to the sheet. In some cases, rather than detaching itself from the sheet and falling to a bed of the machine, a piece of cut material may pivot downward, causing part of the piece to surpass an upper surface of the sheet. The piece of cut material may thus interfere with the motion of a head of the laser cutting machine which stops its work cycle upon such an occurrence, thus requiring operator intervention.

In addition, while the metal sheet blank is made bendable by hand by the weakening cuts, the metal sheet blank can be accidentally bent in a wrong direction since a directionality that is conventionally provided by tools during bending is now absent.

Furthermore, the bent sheet component resulting from bending the metal sheet blank can have a relatively low load bearing capacity, notably due to the presence of the weakening cuts.

Similar problems may arise with sheet blanks made of a rigid material other than metal.

There is therefore a desire for a rigid sheet blank which can alleviate at least some of these drawbacks.

SUMMARY

It is an object of the present technology to ameliorate at least some of the inconveniences present in the prior art.

According to one aspect of the present technology, there is provided a rigid sheet blank. The rigid sheet blank includes a first section configured to be bent about a first axis and a second section configured to be bent about a second axis. The first section has a peripheral edge and at least one tab extending from the peripheral edge. The at least one tab is bendable by hand. The second section defines at least one opening configured for receiving a respective one of the at least one tab during bending of the rigid sheet blank In some implementations of the present technology, a material of the rigid sheet blank is a metallic material.

In some implementations of the present technology, the first axis and the second axis are generally perpendicular to one another.

In some implementations of the present technology, the rigid sheet blank also includes an intermediate section disposed between the first section and the second section. The first section is bendable relative to the intermediate section about the first axis. The second section is bendable relative to the intermediate section about the second axis In some implementations of the present technology, the rigid sheet blank also includes a first seam defining the first axis and a second seam defining the second axis. The first and second seams are configured to facilitate bending of the first and second sections about the first and second axes respectively. Each of the first and second seams includes at least one cut through a material of the rigid sheet blank.

In some implementations of the present technology, each of the at least one tab has a width measured at an intersection of the tab with the peripheral edge of the first section; and a length measured along an axis of the tab from the peripheral edge of the first section to a tip of the tab. The length of the tab is greater than the width of the tab.

In some implementations of the present technology, a ratio of the length of the tab over the width of the tab is between 2 and 5 inclusively.

In some implementations of the present technology, the at least one tab defines a cut adjacent the peripheral edge for facilitating bending of the at least one tab.

In some implementations of the present technology, the at least one tab is curved about an axis normal to the rigid sheet blank.

In some implementations of the present technology, the second section is configured to form a bending radius when bent about the second axis. The at least one tab has a curvature that is concentric with the bending radius to be formed when the second section is bent about the second axis.

In some implementations of the present technology, the at least one tab has a radius measured from an axis common to the bending radius and the curvature of the at least one tab to a tab axis extending centrally and longitudinally of the at least one tab. The radius of the tab is between 5 mm and 60 mm.

In some implementations of the present technology, the at least one tab is bendable by a force applied by hand at an end portion of the at least one tab. The force applied at the end portion of the tab in order to bend the at least one tab is less than or equal to 100 N.

In some implementations of the present technology, the force applied at the end portion of the tab in order to bend the at least one tab is less than or equal to 50 N.

In some implementations of the present technology, the second section has a peripheral edge and at least one lobe forming part of the peripheral edge of the second section. Each of the at least one lobe contains at least part of a respective one of the at least one opening In some implementations of the present technology, the at least one tab includes a first tab and a second tab. The at least one opening includes a first opening for receiving the first tab and a second opening for receiving the second tab.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
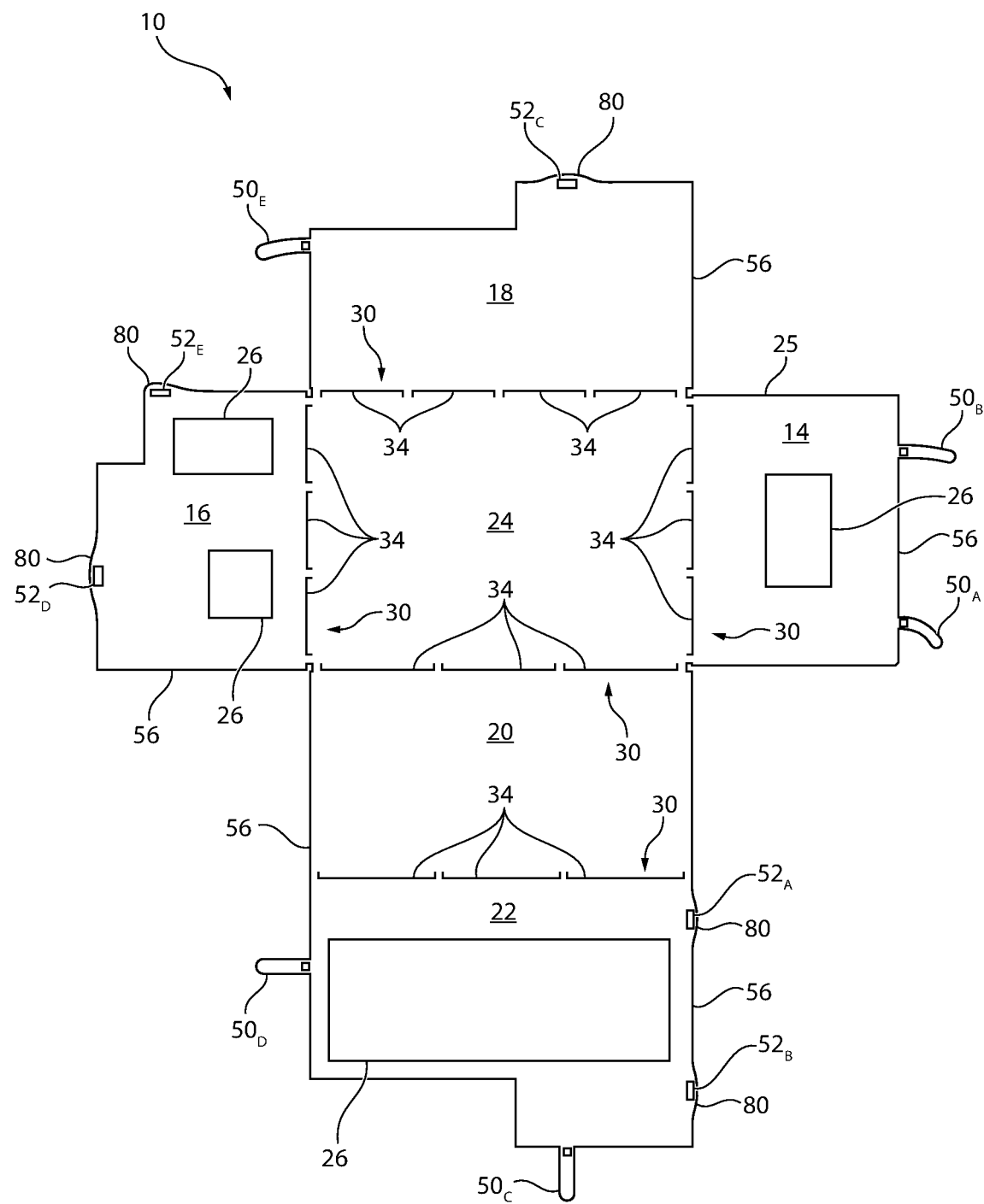
FIG. 1 is a top plan view of a metal sheet blank.
Figure 4:
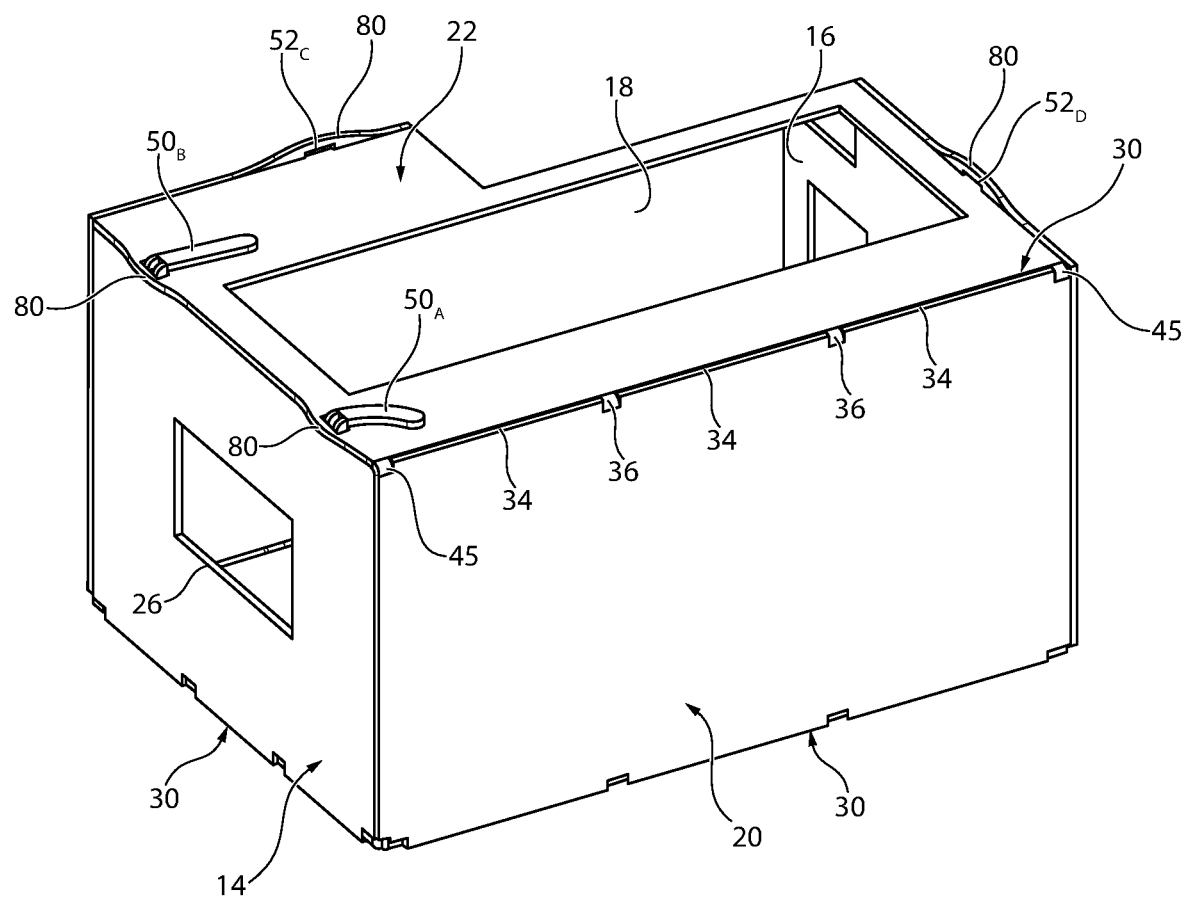
FIG. 4 is a right side perspective view of a bent sheet component having been bent into shape from the metal sheet blank of FIG. 1.

FIG. 1 illustrates a rigid sheet blank 10 for bending into a bent sheet component 500 (FIG. 4). The rigid sheet blank 10 is a flat piece of sheet that is cut from a sheet of rigid material. In this implementation, the rigid sheet blank 10 is made of a metallic material, notably galvanized steel, and will thus be referred to as a metal sheet blank 10. The metallic material of the metal sheet blank 10 could be any other suitable metallic material in other implementations (e.g., stainless steel, aluminum, etc.). Moreover, it is contemplated that the sheet 10 could be made of a rigid material other than metallic material in alternative implementations (e.g., a polymeric material) so long as the material in question is bendable.

The metal sheet blank 10 can be cut from a metal sheet in various ways. In this example, the metal sheet blank 10 is laser cut from the metal sheet by a laser cutting machine. The metal sheet blank 10 may be cut in other ways in other examples (e.g., water jet cutting).

The metal sheet blank 10 has a right side section 14, a left side section 16, a rear side section 18, a front side section 20, a top side section 22 and a bottom side section 24 which are intended to be bent relative to one another to form the bent sheet component 500. Each of the sections is shaped as desired to obtain the bent sheet component 500 once the metal sheet blank 10 is bent. For instance, in this example, the right side section 14, the left side section 16 and the top side section 22 define cut-outs 26.

In order to facilitate bending of the metal sheet blank 10 into the bent sheet component 500, the metal sheet blank 10 has seams 30 separating adjacent ones of the sections 14, 16, 18, 20, 22, 24. More specifically, the seams 30 locally weaken the metal sheet blank 10 such as to facilitate bending of adjacent ones of the sections 14, 16, 18, 20, 22, 24 relative to one another. In particular, the seams 30 allow the metal sheet blank 10 to be bent by hand without using any implements (i.e., toollessly).

Figure 2A:
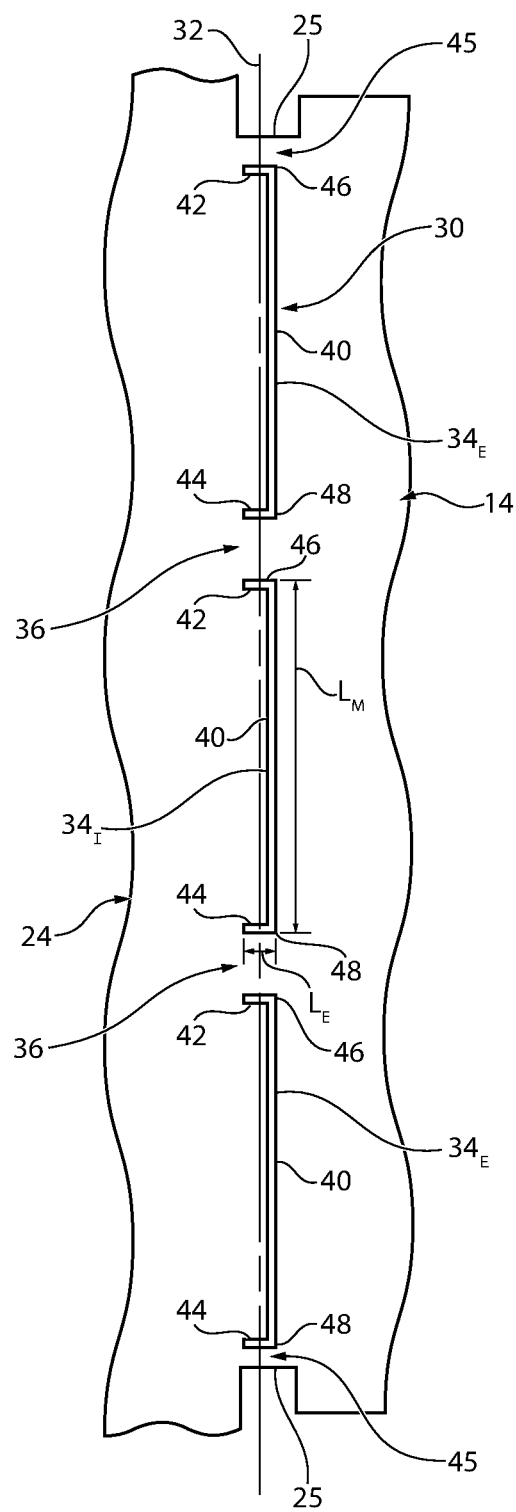
FIG. 2A is a detailed view of a seam separating adjacent sections of the metal sheet blank of FIG. 1.

Each seam 30 extends along a seam axis 32 and includes at least one cut 34 through the material of the metal sheet blank 10. For example, as shown in FIG. 2A, the seam 30 between the right side section 14 and the bottom side section 24 includes three cuts 34, including two end cuts $34_E$ and one intermediate cut $34_I$ which are spaced apart from one another in a direction of the seam axis 32 by a pair of inter-cut material segments 36. Each of the end cuts $34_E$ is located adjacent a peripheral edge 25 of the metal sheet blank 10 (which is formed by a peripheral edge 56 of each of the sections 14, 16, 18, 20, 22) and is spaced from the peripheral edge 25 by an edge material segment 45. Together, the inter-cut segments 36 and the edge segments 45 form a hinge for bending the right side section 14 and the bottom side section 24 relative to one another.

The seams 30 can include more or less than three cuts 34. As shown in FIG. 1, some of the seams 30 include four cuts 34. Moreover, it is contemplated that, in some implementations, the seams 30 could include a single cut 34.

With reference to FIG. 2A, each cut 34 is generally U-shaped and has a main portion 40 and a pair of extensions 42, 44 extending transversely to the main portion 40. The main portion 40 is elongated such as to extend along a direction parallel to the seam axis 32 (e.g., collinear with the seam axis 32) from a first end 46 to a second end 48. Each of the extensions 42, 44 extends from a respective one of the first and second ends 46, 48 and is generally perpendicular to the main portion 40 (i.e., within ±10° of being perpendicular to the main portion 40). The extensions 42, 44 extend on a same side of the main portion 40 (i.e., pointing in the same direction) such that the cut 34 is U-shaped. Each of the extensions 42, 44 has a length $L_E$ that is less than a length $L_M$ of the main portion 40. More specifically, in this implementation, the length $L_E$ of each of the extensions 42, 44 is approximately the same (e.g., within 10% of one another). In this example, a ratio of the length $L_E$ of a given one of the extensions 42, 44 over the length $L_M$ of the main portion 40 is between 0.1 and 0.3.

Figure 2B:
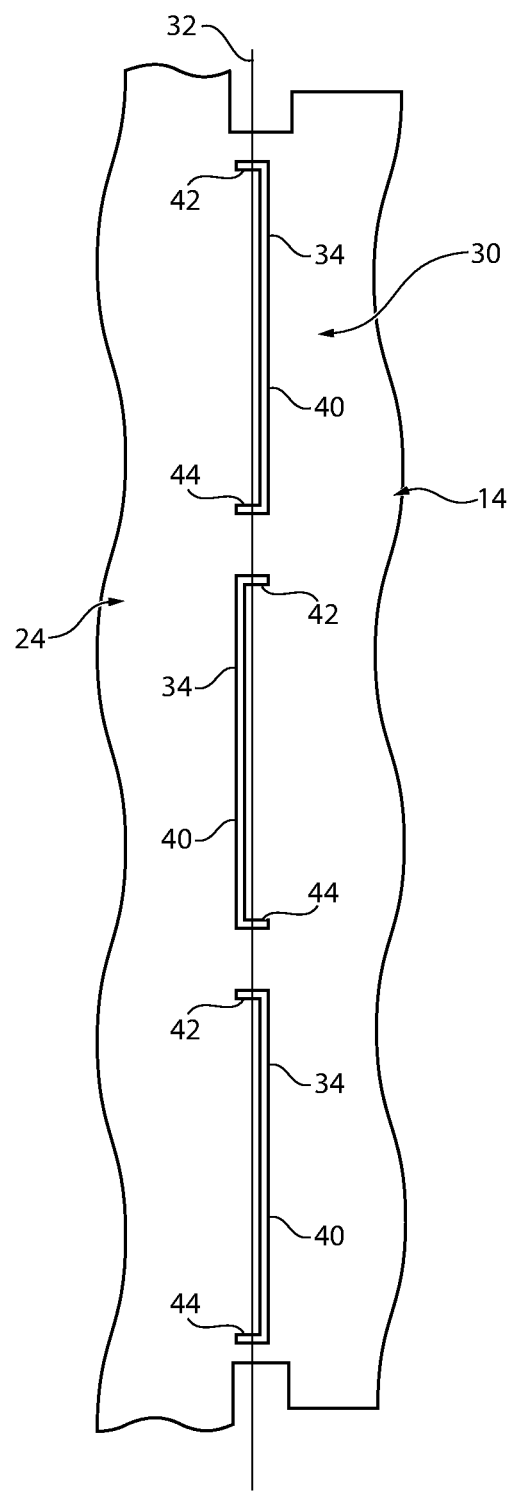
FIG. 2B is detailed view of an alternative implementation of the seam separating adjacent section of the metal blank of FIG. 1.

In this implementation, the main portions 40 of the cuts 34 of a given seam 30 are collinear. Moreover, in this implementation, the extensions 42, 44 of each of the cuts 34 of a given seam 30 extend toward a selected one of two of the sections 14, 16, 18, 20, 22, 24 which that seam 30 separates. For example, with respect to the seam 30 separating the right side section 14 from the bottom side section 24, the extensions 42, 44 of each cut 34 of that seam 30 extent toward the bottom side section 24. It is contemplated that, in alternative implementations, as shown in FIG. 2B, the main portions 40 of the cuts 34 of a given seam 30 may be offset from one another and that the extensions 42, 44 of one or more of the cuts 34 of a given seam 30 could extend toward different ones of two of the sections 14, 16, 18, 20, 22, 24 which that seam 30 separates.

The configuration of the cuts 34 may allow a more time-efficient procedure for producing the metal sheet blank 10. Notably, when laser cutting the metal sheet to form the metal sheet blank 10, material being cut to form the cuts 34 may more easily fall from the sheet which saves the operator from having to intervene to detach portions of material stuck to the sheet. Moreover, the generally perpendicular orientation of the extensions 42, 44 relative to the main portion 40 causes the inter-cut segments 36 and the edge segments 45 to be relatively straight rectangular segments which allow the hinge formed by the inter-cut segments 36 and the edge segments 45 (or just the edge segments 45 if the seam 30 includes a single cut 34) to direct the bending and provide a proper bend about the seam axis 32.

The metal sheet blank 10 is provided with interlocking elements for interlocking certain ones of the sections 14, 16, 18, 20, 22, 24 with one another. More specifically, in this implementation, as shown in FIG. 1, the right side, rear side and top side sections 14, 18, 22 of the metal sheet blank 10 have tabs $50_A$-$50_E$ and the left side, rear side and top side sections 16, 18, 22 define openings $52_A$-$52_E$ for receiving respective ones of the tabs $50_A$-$50_E$ during bending of the metal sheet blank 10. More specifically, during bending of the metal sheet blank 10, the tabs $50_A$-$50_E$ are inserted into corresponding ones of the openings $52_A$-$52_E$ (tab $50_A$ into opening $52_A$, tab $50_B$ into opening $52_B$ and so on) and then bent to extend generally parallel to the given ones of the sections 14, 16, 18, 20, 22, 24 that comprise the corresponding ones of the openings $52_A$-$52_E$. This can increase the load bearing capacity of the resulting bent sheet component 500. Moreover, the tabs $50_A$-$50_E$ can be bent by hand and thus does not require specialized tooling or particularly experienced labour.

The tabs $50_A$-$50_E$ are configured to be bendable by hand such as to avoid using implements when bending the metal sheet blank 10 into the bent sheet component 500.

To that end, the tabs $50_A$-$50_E$ are relatively long. For instance, with reference to FIG. 3, each tab $50_x$ has a length $L_T$ measured along an axis 54 of the tab $50_x$ (extending ce centrally and longitudinally of the tab $50_x$) that is greater than a width $W_T$ of the tab $50_x$ measured at an intersection of the tab $50_x$ with the peripheral edge 56 of a corresponding one of the sections 14, 16, 18, 20, 22. Notably, a ratio $L_T/W_T$ of the length $L_T$ of the tab $50_x$ over the width $W_T$ of the tab $50_x$ is between 2 and 5 inclusively. More specifically, in this example, the ratio $L_T/W_T$ is between 3 and 4. As an example, the length $L_T$ of the tab $50_x$ can be 10 mm and its width $W_T$ can be 3 mm.

Moreover, each tab $50_x$ defines a cut 58 adjacent the peripheral edge 56 of the section comprising the tab $50_x$ in order to facilitate bending of the tab $50_x$. In this implementation, the cut 58 is square or rectangular and forms two segments on either side of the cut 58 that act as a hinge when the tab $50_x$ is bent.

The tabs $50_A$-$50_E$ are thus bendable by applying a relatively low force at an end portion 60 of each tab $50_x$. Notably, in this implementation, a force of less than or equal to 100 N applied by hand at the respective end portion 60 of the tabs $50_A$-$50_E$ is sufficient for bending the tabs $50_A$-$50_E$. In other words, the force applied by hand by an adult user is sufficient to bend the tabs $50_A$-$50_E$.

Figure 3:
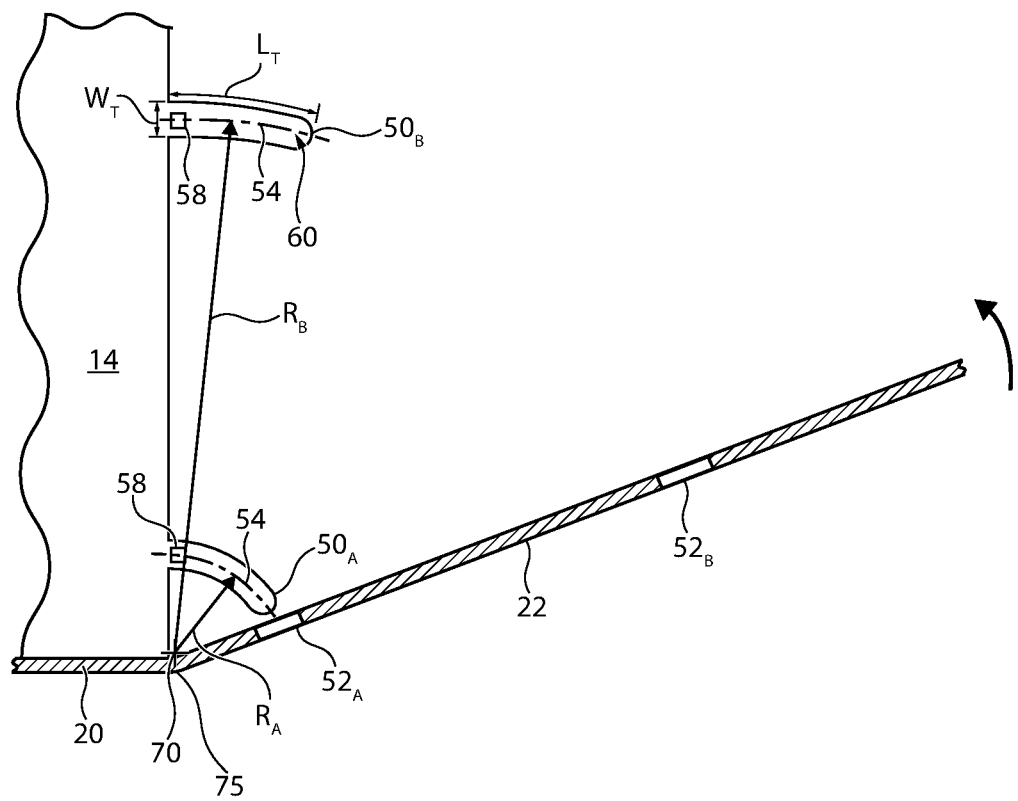
FIG. 3 shows part of the metal sheet blank of FIG. 1 being bent such that tabs of a section of the metal sheet blank engage corresponding openings in another section of the metal sheet blank.

With reference to FIGS. 1 and 3, some of the tabs $50_A$-$50_E$ are curved such as to be inserted into the corresponding openings $50_A$-$50_E$ without reducing the length of the tabs $50_A$-$50_E$ which facilitates their bending.

Notably, the tabs $50_A$, $50_B$ of the right side section 14 are curved about an axis 70 (FIG. 3) that is normal to the metal sheet blank 10. As such, the tabs $50_A$, $50_B$ have respective radii $R_A$, $R_B$ measured from the axis 70 to the respective tab axes 54 of each of the tabs $50_A$, $50_B$. In this example, each of the radius $R_A$ and the radius $R_B$ of the tab $50_B$ is between 5 mm and 60 mm. For instance, in this example, the radius $R_A$ is between 5 mm and 10 mm.

As shown in FIG. 3, a curvature of each of the tabs $50_A$, $50_B$ of the right side section 14 is concentric with a bending radius 75 formed when the top side section 22 is bent about the seam axis 32. As such, the bending radius 75 and the curved tabs $50_A$, $50_B$ have the same axis 70 (which can thus be referred to as a bend axis 70). This may facilitate insertion of the tabs $50_A$, $50_B$ into the openings $52_A$, $52_B$ when the top side section 22 is bent about the seam axis 32.

As will be understood, the curved tabs $50_A$, $50_B$ are comprised by the right side section 14 which is bendable about an axis generally perpendicular to an axis about which the top side section 22, defining the corresponding openings $52_A$, $52_B$, is bendable. More particularly, the seam axis 32 separating the right side section 14 from the bottom side section 24 and about which the right side section 14 is bendable is generally perpendicular to the seam axis 32 separating the top side section 22 from the front side section 20 and about which the top side section 22 is bendable.

Similar to the tabs $50_A$, $50_B$ of the right side section 14, the tab $50_E$ of the rear side section 18 is curved about an axis normal to the metal sheet blank 10. However, it is noted that the tabs $50_C$, $50_D$ of the top side section 22 are straight (i.e., not curved).

Furthermore, in this implementation, the left side, rear side and top side sections 16, 18, 22 have lobes 80 that form part of the peripheral edge 56 of each of these sections 16, 18, 22. Each of the lobes 80 defines an outermost point of a respective edge of which that lobe 80 forms a part of and contains at least part of a respective one of the openings $52_A$-$52_E$. This may facilitate insertion of the tabs $50_A$-$50_E$ into the openings $52_A$-$52_E$.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A rigid sheet blank, comprising:
   a first section configured to be bent about a first axis, the first axis being defined by a first seam that joins the first section and an intermediate section adjacent to the first section, the first section having:
   a peripheral edge; and
   at least one tab extending from the peripheral edge, the at least one tab being bendable by hand, a length of the at least one tab being curved about an axis normal to the rigid sheet blank; and
   a second section configured to be bent about a second axis, the second axis being defined by a second seam spaced apart from the intermediate section, the second section defining at least one opening configured for receiving a respective one of the at least one tab during bending of the rigid sheet blank.

2. The rigid sheet blank of claim 1, wherein a material of the rigid sheet blank is a metallic material.

3. The rigid sheet blank of claim 1, wherein the first axis and the second axis are generally perpendicular to one another.

4. The rigid sheet blank of claim 3, wherein:
   the first section is bendable relative to the intermediate section about the first axis; and
   the second section is bendable relative to the intermediate section about the second axis.

5. The rigid sheet blank of claim 1, wherein the first and second seams are configured to facilitate bending of the first and second sections about the first and second axes respectively, each of the first and second seams including at least one cut through a material of the rigid sheet blank.

6. The rigid sheet blank of claim 1, wherein, for each of the at least one tab:
   the tab has a width measured at an intersection of the tab with the peripheral edge of the first section;

the length of the tab is measured along an axis of the tab from the peripheral edge of the first section to a tip of the tab; and the length of the tab is greater than the width of the tab.

7. The rigid sheet blank of claim 6, wherein a ratio of the length of the tab over the width of the tab is between 2 and 5 inclusively.

8. The rigid sheet blank of claim 1, wherein the at least one tab defines a cut adjacent the peripheral edge for facilitating bending of the at least one tab.

9. The rigid sheet blank of claim 1, wherein:
the second section is configured to form a bending radius when bent about the second axis; and
the at least one tab has a curvature that is concentric with the bending radius to be formed when the second section is bent about the second axis.

10. The rigid sheet blank of claim 9, wherein:
the at least one tab has a radius measured from an axis common to the bending radius and the curvature of the at least one tab to a tab axis extending centrally and longitudinally of the at least one tab; and
the radius of the at least one tab is between 5 mm and 60 mm.

11. The rigid sheet blank of claim 1, wherein:
the at least one tab is bendable by a force applied by hand at an end portion of the at least one tab; and
the force applied at the end portion of the tab in order to bend the at least one tab is less than or equal to 100 N.

12. The rigid sheet blank of claim 11, wherein the force applied at the end portion of the tab in order to bend the at least one tab is less than or equal to 50 N.

13. The rigid sheet blank of claim 1, wherein:
the second section has:
a peripheral edge; and
at least one lobe forming part of the peripheral edge of the second section;
and
each of the at least one lobe contains at least part of a respective one of the at least one opening.

14. The rigid sheet blank of claim 1, wherein:
the at least one tab includes a first tab and a second tab; and
the at least one opening includes a first opening for receiving the first tab and a second opening for receiving the second tab.

* * * * *